United States Patent [19]

Libor

[11] Patent Number: 5,604,168
[45] Date of Patent: Feb. 18, 1997

[54] CLAY-CONTAINING MIXTURE AND BLEND CAPABLE OF FORMING A MOISTURE RESISTANT GEL, AND USE OF THAT MIXTURE AND BLEND

[75] Inventor: Oszkár Libor, Budapest, Hungary

[73] Assignee: Aannemingsbedrijf Van Der Biggelaar Limburg B.V., Wessem, Netherlands

[21] Appl. No.: 495,511

[22] PCT Filed: Jan. 25, 1994

[86] PCT No.: PCT/NL94/00017

§ 371 Date: Nov. 17, 1995

§ 102(e) Date: Nov. 17, 1995

[87] PCT Pub. No.: WO94/18284

PCT Pub. Date: Aug. 18, 1994

[30] Foreign Application Priority Data

Feb. 3, 1993 [HU] Hungary ................................. 2960/93
Jul. 16, 1993 [HU] Hungary ................................ 20361/93

[51] Int. Cl.$^6$ ............................ C04B 33/00; C09K 17/00
[52] U.S. Cl. ..................... 501/141; 106/900; 71/64.09; 71/903; 252/315.5
[58] Field of Search .................. 501/141; 252/315.5; 71/62, 64.09, 903; 106/900

[56] References Cited

U.S. PATENT DOCUMENTS

| | | | |
|---|---|---|---|
| 3,736,758 | 6/1973 | Dolfing et al. | 61/36 R |
| 4,669,920 | 6/1987 | Dymond | 405/264 |
| 4,753,908 | 6/1988 | Kawase et al. | 502/63 |
| 5,120,344 | 6/1992 | Libor et al. | 71/27 |
| 5,407,480 | 4/1995 | Payton et al. | 106/487 |

FOREIGN PATENT DOCUMENTS

| | | |
|---|---|---|
| 0244981 | 11/1987 | European Pat. Off. . |
| 0335653 | 10/1989 | European Pat. Off. . |
| 0495108 | 7/1992 | European Pat. Off. . |
| 2127991 | 10/1972 | France . |
| 1439734 | 6/1976 | United Kingdom . |

*Primary Examiner*—Karl Group
*Attorney, Agent, or Firm*—Seed and Berry LLP

[57] ABSTRACT

A dry mixture of (a) powdered or ground smectite and/or a smectite-containing natural rock, wherein the smectite is in an inactive state, (b) 1–10% by weight of a water-soluble polymer and (c) 0.8–6.0% by weight of a powdered activating agent can be combined with soil and water to provide a gel which is a barrier composition. The mixture may additionally contain a diluting agent, so as to form a dry blend, where the blend may likewise be combined with soil and water to provide a gel which is a barrier composition. The blend may be used to provide for water-tight insulation of vasins, damps and other objects exposed to damaging effects of water, and may also be used as a sealing for deponies, as a protecting layer for articles exposed to acidic liquids, and as a filling agent for cavities and cracks on articles exposed to water.

7 Claims, No Drawings

CLAY-CONTAINING MIXTURE AND BLEND CAPABLE OF FORMING A MOISTURE RESISTANT GEL, AND USE OF THAT MIXTURE AND BLEND

The invention relates to a clay-containing mixture capable of forming a moisture resistant gel, which comprises a powdered or ground smectite and/or a smectite-containing natural rock and 1–10% by weight, calculated for the smectite content, of a water-soluble polymer. Such a mixture may also comprise a diluting agent; this diluted version is termed in the specification as a blend.

A clay-containing mixture and the use thereof in gel formation is known from EP-A-0 335 653. According to this reference a mixture comprising a clay mineral and at least 0.6% by weight of a water soluble polymer is intensely stirred or kneaded in the presence of water to effect reaction between the clay mineral and the polymer. In this way a suspension of a clay mineral/polymer complex forms which is, optionally after a drying step, reacted with at least 0.5% by weight of an activating agent again under intense stirring or kneading in the presence of water. This latter reaction provices a gel capable of taking up and releasing water in a reversible manner. Thus the mixture of clay mineral and water soluble polymer, either with or without water as diluent, is in fact a premixture for gel formation, for which the final gel is obtained in two chemical reactions performed in the presence of water under intense mechanical operations, applying a separately added activating agent as reactant in the second reaction.

The object according to the invention is to improve the method for the preparation of the gel-forming composition to be used in practice, so that the way of handling the mixture of the starting materials is easier, the devices to be used are simpler and the total process is less energy consuming.

The objects are met with a clay-containing mixture or blend according to the invention and is characterized in that both the mixture and the blend are dry solids, the blend comprises as diluting agent more than 0,5% by weight of one or more solid inert filler(s) with an average particle size higher than 0.05 mm, and both the mixture and the blend additionally comprise 0.8–6.0% by weight of a powdered solid activating agent, all the weight percentages being calculated for the smectite present.

According to the invention the blend preferably contains 1–95% by weight based on the weight of the blend, of the solid inert filler, which filler preferably has a particle size of 0.1–8.0 mm. This filler can be selected from sand, silicates, a ground rock or mineral, a ground fired ceramic or mixture thereof. It also is possible to use as the filler a ground waste from building industry.

Both the mixture and the blend according to the invention are dry solids, i.e. free water, being indispensable for any chemical reaction, is absent. When they contact water they spotaneously convert to moisture resistant gels. The term "moisture resistant" as used in the specification means that the gel resists the attacking and aggressive effects of any liquid from its environment, such as rain, water of natural sources, industrial and household waste water and sewages. Characteristic examples of such liquids are those composed primarily of water, which may also contain small amounts of dissolved foreign substances of either mineral or organic origin.

Both the mixture and its diluted version (the blend) can be used in practice for moisture insulation purposes by applying them on a surface or in a hole to be rendered watertightly insulated. When a small area is to be treated or a thin insulating layer is to be formed the mixture may be used as such, whereas for larger areas or thicker layers, such as for sealing a depony, it is much more expedient to use the blend.

Although the known methods lead to the formation of high quality gels applicable with good results for insulation purposes, they have the common disadvantage that the gel should always be preformed by a rather cumbersome mechanical operation. This operation is sometimes difficult to keep in hand and is rather energy-intensive because it requires an intense kneading and a long drying. These disadvantages render the methods less attractive from economical points of view. These problems now have been solved by using the mixture and the the blend according to the invention.

Now it is enough to homogenize the constituents (i.e. smectite or smectite-containing rock, activating agent, polymer and solid additives, the latter only for the blend) in dry state, and to apply the resulting solid dry mixture or blend to the area to be treated, such as below a basin or onto a damp to be insulated. When this dry mixture or blend contacts with water or with any water-containing liquid, such as it is exposed to rainfall, to seeping water or to a seeping aqueous solution, gel formation spontaneously sets in and continues for a prolonged period of time, resulting in the formation of a moisture resistant, water impermeable gel.

Although it is not the intention to bound the invention or to restrict its scope by theoretical considerations, the following physical-chemical processes probably will take place when the solid dry mixture or blend contacts water.

The most hygroscopic components of the dry mixture or blend, being the smectite and the polymer, quickly absorb water from the surface of the mixture or blend. Thereby a moist region appears in the mixture or blend which allows both the smectite and the solid polymer particles to swell, coupled with the continuous dissolution of the polymer. In parallel, the activating cations enter the lattice structure of the swelling smectite, forming thereby active sites in the lattice. The dissolving polymer reacts with the smectite at the thus-formed active sites. Since the reaction proceeds first only on the surface, the activating agent can be applied in a less—sometimes in a much less amount than that would be required for the full activation of the smectite present in the mixture or blend. This relatively low amount of activating agent is sufficient to start the reaction which will then proceed spontaneously. This also improves the stability of the gel structure formed, since no occasional loosely bound and thus interchangeable ion will cause location fault.

Since the aquous medium, which is indispensable for any chemical reaction, forms gradually in the solid dry mixture or blend by the swelling its smectite and polymer components, gel formation is gradual, too, i.e. gel formation proceeds "layerwise" from the surface to the lower parts of the dry mixture or blend. This proceeds by diffusion; the speed of diffusion being determined by numerous factors, such as by the composition of the dry mixture or blend, by the composition of the aqueous liquid, or by the structure of the gel formed. It is essential that even the initially formed thin reacted layer is sometimes enough to provide a complete moisture resistance.

As smectite e.g. montmorillonite, beidellite, hectorite, nontronite, saponite, illite, allevardite, mixtures thereof, natural rocks containing them (such as bentonite), or atificial mixtures of smectite-type silicates (e.g. LAPONITE (trade name) produced by Laporte Co., GB) can be applied. Smectite is present in inactive state which means that lattice sodium and lithium ions, if any, make up not more than 30% of the sum of exchangeable lattice cations. Thus e.g. a montmorillonite containing sodium and calcium ions in a number ratio of 1:3 is still an inactive smectite requiring activating agent to open its lattice structure.

In the solid dry mixture or blend according to the invention the activating agent is present in solid powdered state as a component not built into the lattice structure of the smectite. As activating agent any water-soluble sodium or lithium salt can be applied the anion of which forms an insoluble precipitate with alkaline earth metals. Examples of such activating agents are sodium carbonate, sodium phosphates and polyphosphates, lithium carbonate, lithium phosphate and mixtures thereof, sodium carbonate being the most appropriate.

Any water soluble polymer capable of reacting with a smectite can be applied as polymer component in the blend or mixture according to the invention. Examples of such polymers are those containing —COOH, COO$^-$Me$^+$(Me$^+$ is a monovalent metal cation), —CONH$_2$, —OH and/or =C—O—C= groups as functional groups. Examples of the polymers to be used are polyacryl amide with a hydrolysis degree below 40%, polymethacrylamide, acrylamide-acrylic acid copolymers, vinyl alcohol-acrylic acid copolymers, polyethylene oxides and mixtures thereof. Graft polymers, such as acrylamide grafted onto a cellulose backbone, can also be applied. The molecular weight of the polymer is generally below 15,000,000; the preferred molecular weight range being 400,000–10,000,000. One of the preferred water soluble polymers is the polyacrylamide.

The dry blend according to the invention also contains one or more dry solid fillers. Representatives of fillers have been discussed above. Ground solid mineral wastes (such as ground concrete or crushed bricks, tiles and ceramics) form a specific class of fillers. Using such fillers wastes from building industry may be recycled.

The mixture and the blend according to the invention are prepared by simply homogenizing the individual constituents. The constituents can be introduced in any desired order, and homogenization can also be performed stepwise. Thus one can proceed by preparing the mixture first, which can be homogenized later with the fillers to form the blend. Preferably 1–50 times filler is used on 1 part mixture.

Both the solid dry mixture and the solid dry blend, when protected from moisture, can be stored for a long period. They can easily be applied on horizontal or sloped surfaces by conventional equipments. They can also be applied to fill up cracks or cavities. As mentioned before, for large scale insulation it is recommended to use the blend.

The solid dry blend according to the invention can also be utilized in techniques according to which a blend is applied onto the area to be treated by any oriented high speed fluid (i.e. gaseous or liquid) stream causing high blending turbulence ("concrete-shooting technique"). In this instance the dry blend contacts with water required for the reaction at a well-defined stage of the formation of the highly turbulent stream. With such techniques an elastic layer of excellent adhesion can be formed. This layer can be combined with concrete layer(s), if desired.

Both the type and amount of smectites, polymers, activating agents and inert additives, if present, can be varied within wide limits. The particle size and particle size distribution of the inert solid additive(s) are also rather variable. This means that both the mixture and the blend according to the invention are utmost versatile, and a wide variety of types fitting specific requirements can be provided for.

Apart from its excellent water-insulating properties, the gel formed from the dry mixture or blend according to the invention upon the effect of environmental moisture has other particular advantages, too. The highly acidic aqueous mixtures poured onto the dry mixture or blend get neutral or sometimes even slightly alkaline. Thus, for example, if an aqueous acid with pH 1.5 is poured onto the dry mixture or blend, gel formation sets in, and in parallel with gel formation the pH of the liquid remaining above the gel gradually increases to 7–8. This phenomenon appears even after changing the liquid above the gel to fresh aqueous acid in several cycles. This buffering property of the gel formed from the dry mixture or blend according to the invention is particularly advantageous from the aspects of environment protection and corrosion inhibition. The heat and frost resistance of the gel is excellent; its structure and insulating properties do not change within a temperature range of −22° C. to +60° C. Therefore the dry mixture and blend according to the invention is applicable even under extreme climatic conditions.

The dry mixture and blend according to the invention, and in particular the blend, can be used particularly preferably for the following purposes:

water-tight insulation of basins, damps and other objects exposed to damaging effects of water;

insulation of waste stores;

cover layer of underground waste stores prior to recultivating their surface;

protecting layer for articles exposed to acidic liquids;

filling agent for cavities and cracks on walls, damps and other objects exposed to water to stick the broken parts together;

to form a vibration-balancing and insulationg bed for rail-ways, roads and other objects exposed to vibration damages.

The invention now will be illustrated on basis of the following, non-limiting, examples.

EXAMPLE 1

The mixture was prepared by going out from 73 kg of powdered bentonite originating from Istenmezeje (Hungary) (smectite content: 74% by weight), 40 kg of powdered bentonite originating from Mád-Koldu (Hungary) (smectite content 42% by weight), 4.5 kg of powdered sodium carbonate and 7.6 kg of solid polyacrylamide. These materials were homogenized in a pilot plant size powder blender. Of this mixture 1.7 kg was homogenized with 8.5 kg of dry sand 0.8–4.0 mm in particle size to obtain the blend.

Dry sand, 2–8 mm in diameter, was filled into a glass tube 10 cm in diameter open at both ends but thinned at the bottom part. A 4 cm thick layer of the above dry blend was filled onto the sand. Water was filled onto the dry blend in a height of 1 m, and the assembly was allowed to stand.

The sand filled into the bottom part of the tube remained fully dry even after 2 months.

EXAMPLE 2

The method according to example 1 has been followed by using 0.8 kg of powdered calcium hectorite, 0.5 kg of powdered activated bentonite originating from Bavaria (free sodium carbonate content: 3% by weight, sodium montmorillonite content: 80% by weight), 0.1 kg acrylamide-acrylic acid copolymer powder (degree of hydrolysis: 230%), 5 kg of fine sand (particle size: 0.2–1.0 mm), 4 kg of coarse sand (particle size: 1–3 mm) and 4.5 kg of ground basalt (particle size: 0.5–8.0 mm) which starting materials were blended in a laboratory powder blender for 10 minutes.

Dry soil was layered onto the bottom of a glass vessel with a flow outlet at its bottom, and a 5 cm thick layer was formed on the dry soil from the dry blend with the above composition. Thereafter an aqueous extract of household wastes was filled onto the dry blend in a height of 20 cm. The assembly was allowed to stand. The soil, applied as lowermost layer in the assembly, remained fully dry after 3 weeks.

EXAMPLE 3

The method according to example 1 has been followed by using 0.1 kg of bentonite originating from Wyoming (USA) (sodium smectite content of 87% by weight), 0.4 kg of powdered bentonite originating from Mylos (Greece) (calcium smectite content: 75% by weight), 0.004 kg of powdered sodium carbonate, 0.002 kg of powdered sodium tripolyphosphate, 0.008 kg of powdered polyacrylamide (degree of hydrolysis: 10%) and 0.004 kg of powdered polyethylene glycol (molecular weight: 5 millions) being homogenized in a laboratory powder blender, to obtain the mixture.

0.15 kg of sand (particle size: 0.1–3.0 mm), 0.25 kg of ground basalt (particle size: 0.5–4.0 mm) and 0.3 kg of crushed fired ceramic waste (particle size: 0.1–5.0 mm) and homogenized, and this homogenizate of inert fillers was admixed with 0.3 kg of the dry mixture described in the previous paragraph to obtain the dry blend.

A glass tube 5 cm in diameter was filled up with the following substances in the given order: a 10 cm layer of dry sand, a 4 cm layer of the above dry blend, a 5 cm layer of dry sand, a 4 cm layer of dry soil and a 30 cm layer of an aqueous solution containing 1% by weight of calcium chloride, 0.5% by weight of sodium chloride, 0.1% by weight of ferric sulphate and 0.1% by weight of emulsified gasoline.

The assembly was allowed to stand.

The sand applied as lowermost layer in the assembly remained fully dry after 3 weeks.

EXAMPLE 4

A blend was prepared by going out from 800 kg of dry gravel (particle size: 0.2–8 mm), 20 kg of $B_1$ grade bentonite originatiiong from Germany (sodium smectite content: 78%, free sodium carbonate content: 4%), 40 kg of ON 100 grade bentonite powder originating from Mád (Hungary) (calcium smectite content: 45%), 30 kg of calcium bentonite obtained from Ebrslöh Co. (Germany) (calcium smectite content: 75%), 1.2 kg of powdered sodium carbonate, 0.7 kg of powdered trisodium phosphate, 3 kg of powdered polyacrylamide and 0.5 kg of partially hydrolysed powdered polyacrylamide (degree of hydrolysis: 20%). These starting materials were filled into an industrial concrete blender and homogenized for 15 minutes. This dry blend was applied onto two concrete surfaces, one being vertical and the other being sloped (inclination ratio: 1:3), with a concrete shooting apparatus operated with an air stream being 6 bar in pressure, in such a way that 25% by weight of water, calculated for the weight of the dry blend, was also introduced continuously into the flexible pipeline when directing the stream to the concrete surface.

Thereupon a perfect, even, well-adhering layer was formed on both concrete surfaces.

EXAMPLE 5

A glass tube 3 cm in diameter and 40 cm in height, open at both ends but thinned at the bottom part, was plugged with cotton at its bottom part. Dry sand with a particle size not exceeding 2 mm was layered onto the cotton plug in an height of 3 cm, and then a 2 cm thick layer of the dry blend with the composition described in the first part of Example 1 was formed on the sand layer. The surface of this latter layer was gently compressed and covered with a loose geotextile.

One poured 40 ml of an aqueous sulphuric acid solution (pH 2.4) into the glass tube, and the assembly was allowed to stand for one week. The pH of the upper aqueous solution was measured and was found to be 7.8. This slightly alkaline aqueous solution was removed, and the glass tube was filled up with fresh aqueous sulphuric acid solution of pH 2.4. This cycle was repeated four times. After the fourth cycle the pH of the aqueous layer still raised to 6.8.

I claim:

1. A clay-containing mixture which comprises (a) a powdered or ground smectite and/or a smectite-containing natural rock and (b) 1–10% by weight of a water-soluble polymer, or a blend which additionally comprises a diluting agent, both the mixture and the blend capable of forming a moisture-resistant gel, characterized in that both the mixture and the blend are dry solids, the blend comprises as diluting agent more than 0.5% by weight of one or more solid inert filler(s) with an average particle size higher than 0.05 mm, and both the mixture and the blend additionally comprise (c) 0.8–6.0% by weight of a powdered solid activating agent comprising a water soluble sodium or lithium salt, all the weight percentages being calculated on the weight of the smectite, which smectite is present in an inactive state.

2. The mixture or blend of claim 1, in which the water soluble polymer is a polyacrylamide.

3. The blend of claim 1, which comprises 1–95% by weight of a solid inert filler calculated for the weight of the blend.

4. The blend of claim 1, in which the average particle size of the solid filler is 0.1–8.0 mm.

5. The blend of claim 1, in which the solid inert filler is selected from the group consisting of sand, silicate, ground rock or mineral, ground fired ceramic or a mixture thereof.

6. The blend of claim 5, in which the solid inert filler is a ground waste from building industry.

7. The blend of claim 1, comprising 1–50 weight parts filler based on 1 weight part mixture.

* * * * *